(No Model.)
H. B. NICHOLS.
SUPPORT FOR ELECTRIC CABLES.
No. 448,359. Patented Mar. 17, 1891.
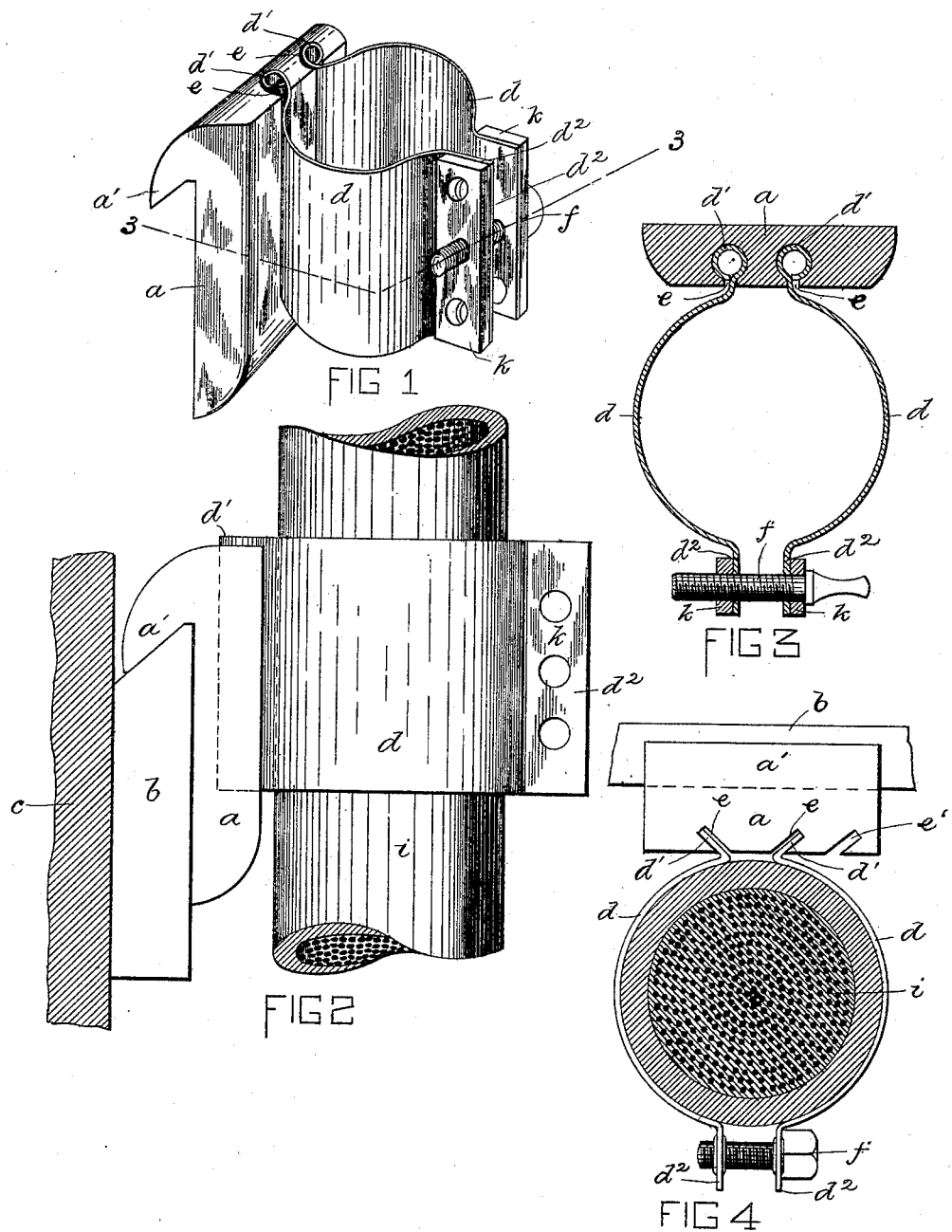

UNITED STATES PATENT OFFICE.

HENRY BERT NICHOLS, OF BOSTON, MASSACHUSETTS.

SUPPORT FOR ELECTRIC CABLES.

SPECIFICATION forming part of Letters Patent No. 448,359, dated March 17, 1891.

Application filed November 15, 1890. Serial No. 371,520. (No model.)

*To all whom it may concern:*

Be it known that I, HENRY BERT NICHOLS, of Boston, in the county of Suffolk and State of Massachusetts, have invented certain new and useful Improvements in Cable Supports or Holders, of which the following is a specification.

This invention has for its object to provide a simple and efficient clamp or holding device adapted to support an electric cable on the side of a building or on the wall of an apartment or any other fixed support, along which such cables are conducted.

The invention consists in a cable clamping or supporting device comprising a rigid plate or holder adapted to be engaged in any suitable way with a fixed support, clips or clamps engaging at their inner ends with the said plate and constituting a sectional or compressible socket formed to receive the cable, and means for compressing said socket upon the cable to enable the socket to securely support the cable, all of which I will now proceed to describe.

In the accompanying drawings, forming a part of this specification, Figure 1 represents a perspective view of a cable-supporting device embodying my invention, the cable being absent. Fig. 2 represents a side view of the same, showing a section of the cable in place in the holder. Fig. 3 represents a section on line 3 3, Fig. 1. Fig. 4 represents an end view of a cable-holder embodying my invention, but differing somewhat in construction from the holder shown in the preceding figures.

The same letters of reference indicate the same parts in all the figures.

In the drawings, $a$ represents a rigid plate or holder, which is adapted to be engaged with a cleat or rib $b$, attached to a wall or other support $c$, the engagement of the plate $a$ with the rib or cleat $b$ being, preferably, by means of a hooked ear or flange $a'$ on the upper edge of the plate $a$, said ear or flange $a'$ engaging the beveled upper edge of the cleat or rib $b$, as shown in Fig. 2.

$d\ d$ represent clips or clamps, which are preferably pieces of flexible sheet-steel or other suitable metal, each bent into a nearly semicircular form, and each provided at its inner end with an ear $d'$, said ears being formed to enter recesses $e\ e$ in the plate $a$. The opposite ends of the clips $d$ are bent outwardly to form ears $d^2\ d^2$, which are connected by a suitable clamping or compressing device—such, for example, as a thumb-screw $f$—which is engaged with a threaded aperture in one ear and with an unthreaded aperture in the other ear, the head of said screw bearing upon the ear having the unthreaded aperture, so that upon the rotation of the screw in one direction the ears $d^2\ d^2$ will be drawn toward each other, and thus caused to compress the socket, which is formed by the clips $d\ d$.

It will be seen from the foregoing that a cable $i$, inserted between the clips $d\ d$, may be engaged therewith by suitably rotating the screw $f$, the said socket which the clips compose being thus compressed upon the periphery of the cable.

The construction of the holding device above described is extremely simple, the clips $d\ d$ being readily formed by striking up or bending blanks of sheet metal, while the plate $a$, with its recesses $e\ e$, may be readily formed by casting. The clips $d\ d$ are engaged with the plate $a$ by inserting the ears $d'\ d'$ into the recesses $e\ e$. Said recesses are preferably open only at the upper edge of the plate $a$, so that their lower ends constitute stops, on which the lower ends of the ears $d'\ d'$ rest, said ears being removable from the plate by an upward movement out of the recesses $e$.

I prefer to re-enforce the ears $d^2$ by means of plates $k\ k$, riveted to their outer surfaces, as shown in Figs. 1, 2, and 3.

In Fig. 4 I have shown the ears $d'\ d'$ as flat and arranged diagonally instead of being rounded, as shown in Figs. 1 and 3, the recesses $e\ e$ having a corresponding diagonal arrangement. I also show in Fig. 4 an additional recess $e'$, which may be used when a considerably larger cable is to be supported, one of the clips being engaged in the said additional recess $e'$, so that the socket is given a greater holding capacity.

The plate $a$ is shown in Figs. 1 and 2 as constructed to hold the clips $d\ d$ in a vertical position, and thus adapt them to the supporting of a vertical cable; but it is obvious that the recesses e e may extend horizontally, so that the plate will support the socket in a horizontal position.

I do not limit myself to the details of construction in all of the parts above described, but may modify the same in minor parts without departing from the spirit of my invention.

I claim—

1. The improved cable clamping or supporting device comprising a rigid plate or holder, clips or clamps engaged at their inner ends with said plate, said clips constituting a sectional socket formed to receive the cable, and means for compressing said socket upon the cable, as set forth.

2. The combination of a rigid plate or holder having recesses in one side, clips or clamps having ears formed to enter said recesses, said clips or clamps constituting a sectional socket, and means for compressing said socket upon a cable, as set forth.

3. A compressible socket composed of flexible clips or clamps, combined with a rigid holder, with which the inner ends of said clips are engaged, and a compressing device applied to their outer ends, as set forth.

4. The combination of the rigid back plate having recesses in one side, the flexible clips or clamps having ears formed to engage said recesses, and a clamping-screw connecting the outer ends of said clips or clamps, as set forth.

5. The combination, with the clips or clamps constituting a sectional socket and provided with a compressing device, of the rigid back plate having recesses in one side to receive ears on said clips, and a hook or flange on its opposite side for engagement with a fixed support, as set forth.

6. A cable-supporting plate having a hook or flange adapted for engagement with a fixed support, combined with an adjustable socket attached to said plate and adapted to grasp or clamp a cable, as set forth.

In testimony whereof I have signed my name to this specification, in the presence of two subscribing witnesses, this 3d day of October, A. D. 1890.

HENRY BERT NICHOLS.

Witnesses:
C. F. BROWN,
EWING W. HAMLEN.